April 10, 1934. M. PIER ET AL 1,954,096
DESTRUCTIVE HYDROGENATION OF CARBONACEOUS MATERIALS
Filed April 25, 1929
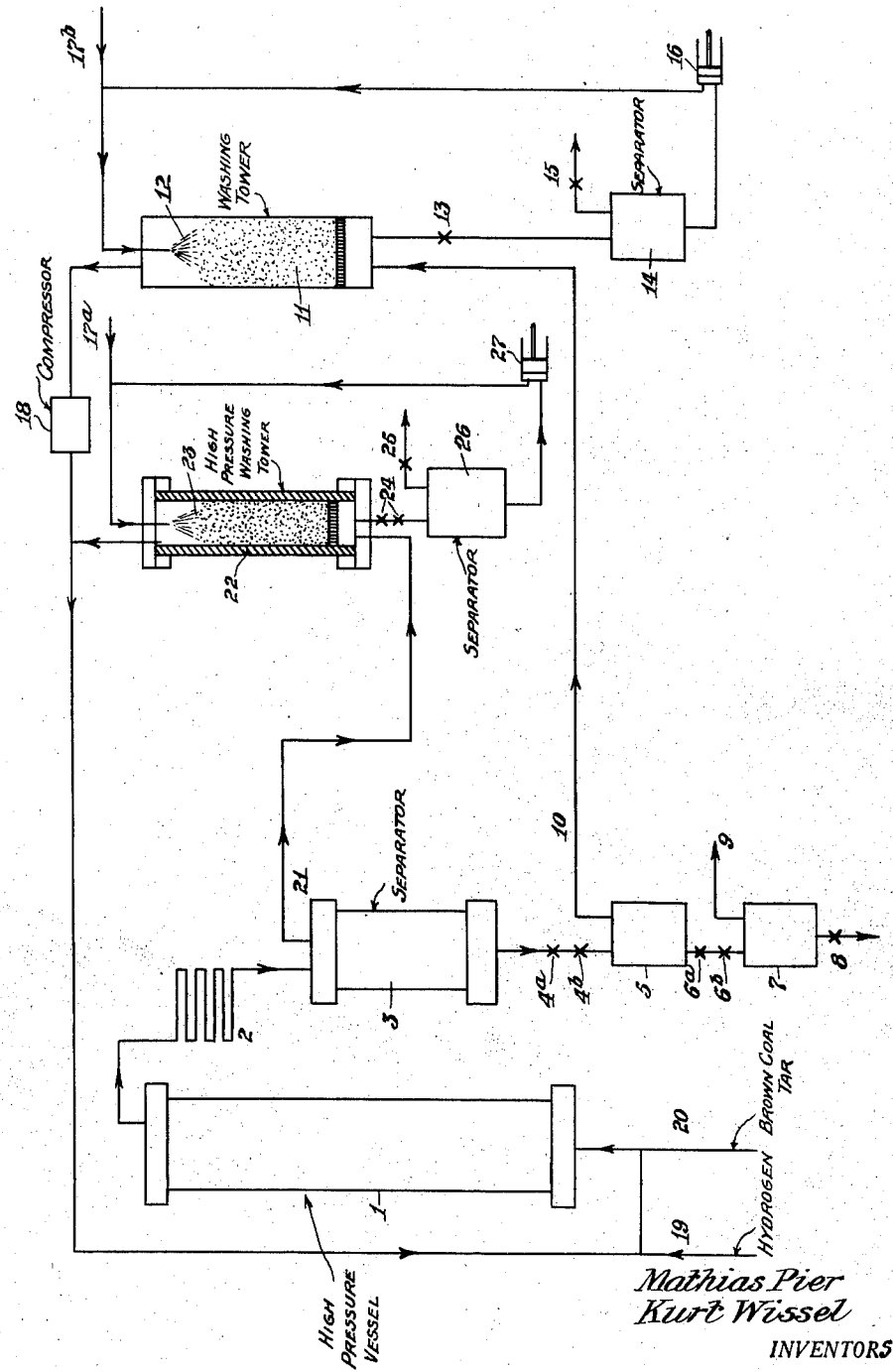
Mathias Pier
Kurt Wissel
INVENTORS
BY Hauff & Warland
ATTORNEYS.

Patented Apr. 10, 1934

1,954,096

UNITED STATES PATENT OFFICE 1,954,096

DESTRUCTIVE HYDROGENATION OF CARBONACEOUS MATERIALS

Mathias Pier, Heidelberg, and Kurt Wissel, Ludwigshafen-on-the-Rhine, Germany, assignors, by mesne assignments, to Standard-I. G. Company, Linden, N. J., a corporation of Delaware Application April 25, 1929, Serial No. 358,154
In Germany June 18, 1928

5 Claims. (Cl. 196—53)

This invention relates to an improved method for the recovery of the valuable low-boiling products and in particular of the gaseous products present in the reaction mixture obtained from processes for the destructive hydrogenation of distillable carbonaceous materials.

We have found that in the destructive hydrogenation under pressure of distillable carbonaceous materials, such as coal in all its varieties, tars, mineral oils, the products obtained from the said substances by distillation, extraction or conversion and the like for the purpose of producing valuable liquid products such as benzines, lubricating oils and the like, other valuable low-boiling and in particular gaseous products are obtained by subjecting to condensation, while still under pressure, the gases and vapors leaving the reaction chamber, separating the uncondensed gases and vapors from the condensate obtained and then fractionally releasing the pressure on the said condensate. The said condensation is effected by cooling.

The fractional releasing of pressure is of great technical advantage since the gas obtained by the first releasing of the pressure on the condensate, which is very rich in hydrogen may be again employed in the destructive hydrogenation process, preferably after removal of the small quantities of hydrocarbons therein, for example by thermal decomposition, at temperatures of say about 900° centigrade or more, or, for instance, by treatment with steam, carbon dioxide, or other decomposing gases in the presence of catalysts such as iron or nickel for example at about 500° to 1200° centigrade. The gas obtained by further releasing of the pressure contains valuable hydrocarbons such as pentane, propane, butane and the like in a concentrated form, and these may be isolated for example by compression or by strong cooling. A particular advantage of the fractional releasing of pressure is that the amount of hydrogen contained in the gas obtained by the second or later stages of the fractional releasing of pressure is very small, and thus the loss of hydrogen from the circulating gas is reduced to a minimum.

By a repeated compression of the gas obtained by releasing the pressure or by washing the same with solvents and absorbents, or by both these operations, a further separation and also a condensation of any hydrocarbon vapor, which has been carried along may be effected.

The hydrogenating gas which is to be used in circulation may also be subjected to washing, in order to wash out any hydrogen sulphide and hydrocarbons which have not been removed by the liquid products obtained in the reaction itself.

As a rule the products issuing from the destructive hydrogenation are cooled to about room temperature. It is, however, to be understood that also other cooling temperatures, for example 20° or 30° above or below ordinary temperature, may be employed. In these cases the composition of the final liquids obtained will be somewhat different from that resulting at ordinary temperature. Also the composition of the uncondensed gases and the gases obtained after each stage of pressure release will differ from that of the corresponding gases obtained by cooling to ordinary temperature. In any case, however, gases containing hydrogen and hydrocarbons of low boiling points, in particular gaseous hydrocarbons, are obtained. Since the said gases, before being used for the hydrogenation process, are ordinarily removed from the gaseous hydrocarbons contained therein, for example by washing with oils, very different cooling temperatures may be employed.

As examples of pressures suitable for application in the said destructive hydrogenation may be mentioned 20, 50, 100, 200 atmospheres or even higher pressures, for example 1000 atmospheres. The process may be carried out in the presence of catalysts, such immune from poisoning by sulphur being of particular advantage, and more especially, those comprising a metal, usually in the form of a compound from the sixth group of the periodic system. Examples of such catalysts are those prepared from molecular proportions of molybdic acid and zinc oxide or from molecular proportions of tungstic acid, zinc oxide and magnesium oxide. When very active catalysts such as those containing molybdenum are employed, pressures as low as 5 atmospheres may be utilized with advantage in the destructive hydrogenation.

The nature of the present invention will be further understood with reference to the accompanying drawing which shows in a somewhat diagrammatic manner an elevation, partly in section, of a plant suitable for carrying out the process according to the present invention.

Referring to the drawing in detail numeral 1 denotes a high pressure vessel into which brown coal tar supplied by pipe 20 is treated with hydrogen, supplied at 19, at a temperature of 450° C. and under a pressure of 200 atmospheres. The liquid and vaporous products issuing from the high pressure vessel are passed at the same pressure, together with the waste hydrogenating gas, into the condenser 2 cooled with water in which the constituents condensable at ordinary temperature are condensed. In the liquid product issuing from the condenser 2 and of which 15 per cent boil up to 200° C. and 70 per cent up to 325° C., hydrogen, methane, gaseous homologues thereof and hydrogen sulphide are absorbed in amounts corresponding to the partial pressures thereof in the uncondensed gases. The liquids are then separated from the gases in the separating vessel 3, whereupon the liquids are conveyed through valves 4a and 4b into the vessel 5 maintained at a pressure of 25 atmospheres. The constituents remaining liquid in this vessel are then passed by way of valves 6a and 6b into vessel 7 kept at ordinary pressure wherefrom the liquids are withdrawn at 8 while the gases evolved, consisting of from 5 to 10 per cent of hydrogen, 70 to 80 per cent of methane and gaseous homologues thereof and 5 per cent of hydrogen sulphide, are removed at 9. The gases and vapors evolved in vessel 5 are led by way of pipe 10 into washing tower 11 in which they are passed under a pressure of 25 atmospheres through a shower of washing oil supplied at 12 which adsorbs in particular the gaseous hydrocarbons and hydrogen sulphide. The waste washing oil is released from pressure by valve 13 and then separated from the gases evolved therefrom in the separating vessel 14. The washing oil withdrawn from vessel 14 may be recycled to vessel 11 by way of pump 16, if desired after adding thereto fresh washing oil supplied at 17b. The gas issuing at the top of vessel 11 is practically free from hydrocarbons and hydrogen sulphide. It may, after compression to 200 atmospheres in compressor 18, be recycled to the hydrogenating vessel 1. The gas not condensed in the condenser 2 leaves the separating vessel 3 at 21 and is washed, while under a pressure of 200 atmospheres, in the washing tower 22 capable of resisting high pressures. The washing oil requisite for this operation is sprayed in at 23 and withdrawn at the bottom of the said tower. It is then relieved from pressure by valves 24, whereby the gases dissolved in the oil are substantially evolved therefrom. The oil is separated from these gases in separating vessel 26 and may be returned to the washing tower 22 by way of pump 27. The gases separated in vessel 26 from the washing oil are withdrawn at 25. The gases not absorbed by the washing oil in tower 22 are added to the hydrogenating gas recycled from tower 11 to the reaction vessel 1.

The following example will further illustrate the nature of the invention but the invention is not restricted thereto.

*Example*

The liquid and vaporous products obtained by destructive hydrogenation of brown coal at about 200 atmospheres and at about 450° centigrade are passed, together with the hydrogenating gas which has been pumped in circulation, first through a condenser, and then into a stripping vessel; here the separation of the gaseous constituents, which have not been condensed or absorbed, from the liquid occurs. The gaseous constituents are again circulated in the destructive hydrogenation process. In the remaining liquid, which consists of 15 per cent of constituents boiling at up to 200° centigrade and 70 per cent boiling at up to 325° centigrade, hydrogen, methane and its homologues and hydrogen sulphide are absorbed in a ratio corresponding to the partial pressures of these gases in the circulating gas. The pressure on the liquid is first reduced from 200 atmospheres to about 25 atmospheres, and then secondly from about 25 atmospheres to about 1 atmosphere. By means of this releasing of pressure in stages a favorable separation of the absorbed gases is obtained since the gas obtained by reducing the pressure from about 200 atmospheres to about 25 atmospheres contains about 50 to 70 per cent of hydrogen, 20 to 35 per cent of hydrocarbons and 2 per cent of hydrogen sulphide, and the gas obtained in the second stage contains about 5 to 10 per cent of hydrogen, 70 to 80 per cent of hydrocarbons and 5 per cent of hydrogen sulphide. The hydrocarbons are removed from the gas obtained in the first stage by thermal decomposition or by adsorption with solvents, and the practically pure hydrogen obtained is added to the hydrogenating gas in circulation after compression to 200 atmospheres.

The circulating gas, which has not been absorbed by the condensate is kept at the same pressure and is passed through a high pressure washer filled with Raschig rings, and through which a counter current of middle oil, the greater part of which boils at between 200° and 325° centigrade, is caused to trickle. The oil, used for the washing, is employed in a circulatory cycle, and may also be subjected to fractional releasing of pressure, and if desired may be treated in vacuo in order to effect a more complete removal of gas.

What we claim is:—

1. In the process of recovering hydrocarbon gases and hydrogen from the vaporous products issuing from a destructive hydrogenation reaction effected under a pressure of at least 20 atmospheres which comprises subjecting said vaporous products to condensation while under the destructive hydrogenation pressure, separating the resulting condensed liquids from the uncondensed gases, recycling said uncondensed gases to the destructive hydrogenation reaction, partially releasing the pressure on the liquid condensate to effect a separation of a portion of the normally gaseous constituents contained therein, removing the hydrocarbons present in the gaseous constituents thus obtained, recycling the remaining gaseous constituents to the destructive hydrogenation reaction and completely releasing the pressure on the residual condensate in one or more stages to effect a removal of the residual normally gaseous constituents contained in said condensate.

2. In the process of recovering hydrocarbon gases and hydrogen from vaporous products issuing from a destructive hydrogenation reaction effected under a pressure of at least 20 atmospheres which comprises subjecting said vaporous products to condensation while under the destructive hydrogenation pressure, separating the resulting condensed liquids from the uncondensed gases, washing the uncondensed gases to remove products other than hydrogen, recycling the hydrogen to the destructive hydrogenation reaction, partially releasing the pressure on the liquid condensate to effect a separation of normally gaseous constituents, washing said gaseous constituents to remove products other than hydrogen, recycling the hydrogen so obtained to the destructive hydrogenation reaction and completely releasing the pressure on the residual condensate to effect a removal of the residual normally gaseous constituents contained in said condensate.

3. In the process of recovering hydrocarbon gases and hydrogen from vaporous products issuing from a destructive hydrogenation effected under a pressure of at least 20 atmospheres, which comprises subjecting said vaporous products to condensation while under the destructive hydrogenation pressure, separating the resulting condensed liquids from the uncondensed gases, washing the uncondensed gases under high pressure to remove products other than hydrogen therefrom, recycling the hydrogen so obtained to the destructive hydrogenation reaction, partially releasing the pressure on the liquid condensate to effect a separation of normally gaseous constituents therefrom, washing said constituents to remove products other than hydrogen therefrom, recompressing the hydrogen so obtained and recycling it to the destructive hydrogenation reaction and releasing the pressure on the residual condensate to effect a removal of residual normally gaseous constituents therefrom.

4. The process as defined in claim 2 wherein the destructive hydrogenation is effected at a pressure of 200 atmospheres and the pressure on the liquid condensate is first reduced from 200 atmospheres to about 25 atmospheres and finally from about 25 atmospheres to about 1 atmosphere.

5. The process as defined in claim 2 wherein the vaporous products treated are obtained by the destructive hydrogenation of brown coal at a pressure of about 200 atmospheres and a temperature of about 450° C. and the pressure on the liquid condensate is first reduced from 200 atmospheres to about 25 atmospheres and finally from about 25 atmospheres to about 1 atmosphere.

MATHIAS PIER.
KURT WISSEL.